US012145727B2

(12) United States Patent
Barrett

(10) Patent No.: US 12,145,727 B2
(45) Date of Patent: Nov. 19, 2024

(54) ENHANCED OBSERVABILITY UNINHABITED AERIAL VEHICLES AND METHODS OF USE

(71) Applicant: University of Kansas, Lawrence, KS (US)

(72) Inventor: Ronald Martin Barrett, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 17/891,644

(22) Filed: Aug. 19, 2022

(65) Prior Publication Data

US 2024/0059411 A1 Feb. 22, 2024

(51) Int. Cl.
| | |
|---|---|
| *B64C 39/02* | (2023.01) |
| *B64C 3/52* | (2006.01) |
| *B64C 27/22* | (2006.01) |
| *B64C 33/02* | (2006.01) |
| *B64D 47/00* | (2006.01) |
| *G05D 1/00* | (2006.01) |
| *B64U 10/40* | (2023.01) |

(52) U.S. Cl.
CPC .............. *B64C 39/024* (2013.01); *B64C 3/52* (2013.01); *B64C 27/22* (2013.01); *B64C 33/02* (2013.01); *B64D 47/00* (2013.01); *G05D 1/101* (2013.01); *B64U 10/40* (2023.01)

(58) Field of Classification Search
CPC ............ B64C 3/52; B64C 27/22; B64U 10/40
See application file for complete search history.

(56) References Cited

U.S. PATENT DOCUMENTS

| | | | |
|---|---|---|---|
| 2,678,783 | A | 5/1954 | George |
| D176,461 | S | 12/1955 | Jackson |
| D178,252 | S | 7/1956 | Lent |
| D181,599 | S | 12/1957 | Nelson et al. |
| 2,845,746 | A | 8/1958 | McKinney |
| D184,193 | S | 12/1958 | Peterson et al. |
| D184,209 | S | 1/1959 | Bell et al. |

(Continued)

FOREIGN PATENT DOCUMENTS

| | | |
|---|---|---|
| CN | 102050222 A | 5/2011 |
| WO | 2013048339 A1 | 4/2013 |
| WO | 2014055899 A1 | 4/2014 |

OTHER PUBLICATIONS

Etkin, Bernard, et al; "Dynamics of Flight Stability and Control", Third Edition, 1996, 395 pages.

(Continued)

*Primary Examiner* — Richard G Davis
(74) *Attorney, Agent, or Firm* — RAY QUINNEY & NEBEKER P.C.; Paul N. Taylor

(57) ABSTRACT

Aerial vehicles, their structures and methods of locomotion are described. An aerial vehicle may include a fuselage having an x-axis, a plurality of flexible structures emanating from the fuselage that take the form of a feather, wing and/or tentacle, at least one motor, and at least one propeller driven by one or more motors. Each flexible structure may extend from a fuselage in any direction and are used to enhance the observability of the aircraft by moving and/or oscillating within a frequency band and at a magnitude that is more easily observed by and catches the human eye.

19 Claims, 13 Drawing Sheets

(56) References Cited

U.S. PATENT DOCUMENTS

| | | | |
|---|---|---|---|
| 3,063,375 A | 11/1962 | Hawley et al. | |
| 3,578,263 A | 5/1971 | Gunter et al. | |
| 3,884,431 A | 5/1975 | Burrell | |
| D250,966 S | 1/1979 | Spore | |
| D251,454 S | 3/1979 | Takahashi | |
| D258,672 S | 3/1981 | Butcher | |
| D290,101 S | 6/1987 | Chung | |
| 4,779,534 A | 10/1988 | Wang | |
| 5,060,886 A | 10/1991 | Davis et al. | |
| 5,082,079 A | 1/1992 | Lissaman et al. | |
| 5,289,994 A | 3/1994 | Del Campo Aguilera | |
| D346,844 S | 5/1994 | D'Andrade | |
| D351,432 S | 10/1994 | Dudeck et al. | |
| D353,414 S | 12/1994 | Crane | |
| D377,326 S | 1/1997 | Grossman et al. | |
| D380,236 S | 6/1997 | Kupperman | |
| 6,082,671 A * | 7/2000 | Michelson | B64C 39/028 249/11 |
| D438,914 S | 3/2001 | O'Rourke et al. | |
| 6,260,796 B1 | 7/2001 | Klingensmith | |
| 6,502,787 B1 | 1/2003 | Barrett | |
| D474,237 S | 5/2003 | Levine | |
| D486,777 S | 2/2004 | Schell | |
| D500,809 S | 1/2005 | Mc Kenna et al. | |
| 6,840,476 B1 * | 1/2005 | Raney | B64C 39/028 244/22 |
| D503,140 S | 3/2005 | Blevio, Sr. | |
| D509,261 S | 9/2005 | Tebbe | |
| 7,416,466 B2 | 8/2008 | Isawa | |
| D589,868 S | 4/2009 | Matharan et al. | |
| 7,601,046 B2 | 10/2009 | Chang | |
| D624,971 S | 10/2010 | Cohen et al. | |
| D627,235 S | 11/2010 | Lo et al. | |
| 7,874,513 B1 | 1/2011 | Smith | |
| D679,339 S | 4/2013 | Genovese | |
| D679,340 S | 4/2013 | Genovese | |
| D697,145 S | 1/2014 | Wong | |
| 9,102,407 B2 * | 8/2015 | Greenyer | B64C 33/02 |
| D761,920 S | 7/2016 | Fargeau et al. | |
| D778,821 S | 2/2017 | Broadhurst, IV et al. | |
| D853,939 S * | 7/2019 | Barrett | D12/328 |
| 10,561,956 B2 | 2/2020 | Barrett et al. | |
| 11,192,647 B2 | 12/2021 | Sergison et al. | |
| 2002/0030142 A1 | 3/2002 | James | |
| 2005/0009440 A1 | 1/2005 | Foster et al. | |
| 2006/0038061 A1 | 2/2006 | Blevio, Sr. et al. | |
| 2008/0274664 A1 | 11/2008 | Adamonis et al. | |
| 2010/0152933 A1 | 6/2010 | Smoot et al. | |
| 2010/0252690 A1 | 10/2010 | Hothi et al. | |
| 2011/0001020 A1 | 1/2011 | Forgac | |
| 2011/0042509 A1 | 2/2011 | Bevirt et al. | |
| 2011/0168835 A1 | 7/2011 | Oliver | |
| 2011/0226892 A1 | 9/2011 | Crowther et al. | |
| 2012/0286102 A1 | 11/2012 | Sinha et al. | |
| 2014/0117149 A1 | 5/2014 | Zhou et al. | |
| 2014/0131507 A1 | 5/2014 | Kalantari et al. | |
| 2014/0131510 A1 | 5/2014 | Wang et al. | |
| 2014/0319266 A1 | 10/2014 | Moschetta et al. | |
| 2015/0191246 A1 | 7/2015 | Kalantari et al. | |
| 2016/0009381 A1 | 1/2016 | Benatar et al. | |
| 2016/0023759 A1 * | 1/2016 | Barrett | B64C 27/20 244/17.23 |

OTHER PUBLICATIONS

International Search Report and Written Opinion for International Application No. PCT/US2023-030617 mailed Oct. 3, 2023.
Lieshman, J. G., "Principles of Helicopter Aerodynamics," Cambridge University Press, 2008, 25 pages.

* cited by examiner

ENHANCED OBSERVABILITY UNINHABITED AERIAL VEHICLES AND METHODS OF USE

FIELD OF THE DISCLOSURE (TECHNICAL FIELD)

The disclosure is generally related to aerial vehicles. More particularly, this disclosure is related to flying aircraft which are able to hover like helicopters, using a plurality of propellers for lift and flight control, and also fly in translational flight.

BACKGROUND

The first uninhabited aerial vehicles were anticipated many thousands of years ago in pre-history by keepers of oral traditions. Ancient Greeks described the Sun God Apollo as divinely guiding Paris' arrow into Achilles' heel in The Iliad. Since that time, more modern authors like Jules Verne anticipated uninhabited aerial vehicles (aerial vehicle, or, more generally as used herein, aerial vehicles) in the form of what we would now describe as "guided missiles." The first technologist to actually make a remotely controlled vehicle is Nikola Tesla as his "Teleautomation" could be guided by radio control from distances of several hundred yards away. Since the turn of the last century, the number and variety of aerial vehicle have become extremely large with many flying like helicopters, some like airplanes, yet more like missiles.

Many aerial vehicles may be used for recreational purposes. Some aerial vehicles may be used for military missions. These "drones" often sport cameras and can be seen flying in parks and over combat zones. Many aerial vehicles are difficult to see, especially at extended distances. This may be a design feature for aerial vehicles. Some aerial vehicles may be flown in so-called "Third-Person Flight" modes. This flight mode is typically described as the condition wherein a given drone pilot has their eyes on the drone at all times and controls the drone by simply observing its position and the way that it moves, or "Flight State." For some drones like model airplanes, this is quite easy to do because airplane wings can be relatively large and brightly painted. Accordingly, ground observers can easily determine left from right, front from back at reasonable distances. Full-scale airplanes are often observed more easily not just because their wings are larger but are often required by law to be equipped with Position and Anticollision Lights. Because multi-copter drones often do not have large surfaces like airplane wings for a pilot to cue from, some manufacturers use various patterns of light-emitting diodes (LEDs) to indicate aircraft position and flight state when steered by a pilot using third-person guidance.

In some situations, federal regulations, such as 14 CFR § 107.29—"Operation at Night," regulate that anticollision lights, most often formed from LEDs, are visible to at least 3 miles. Such lights may be easily viewed during low-light conditions, such as at nighttime. But in high ambient-light conditions, such as during the day, anticollision lights may have limited visibility. Indeed, some LED-equipped aircraft have been shown to be less visible to the point that they effectively "disappear" against a background sky.

U.S. Pat. No. 11,192,647 describes the use of LED equipped aircraft for doing just this. This technology has its roots as far back as the "Yehudi" program of WWII and emulates the effect of the Visual Signature Suppression System pioneered in The Netherlands. In 2004 it was shown that by coating an aircraft with a light emitting skin that matched the luminosity of the background sky, it could be made to completely disappear at altitudes as low as 100 m.

To aid pilots who are flying drones in third-person flight modes, there is a need to provide them with aircraft design features to provide improved aircraft orientation and flight state queueing. The present disclosure describes drone design features that aid both daytime and nighttime third-person flight by making the aircraft and its orientation much more visible to the third-person pilot and other ground observers. This disclosure relates to new methods to improve the visibility, ground observer situational awareness, pilot situational awareness, and flight state of multi-copter drones. The innovation relates to methods which capture the human eye and take advantage of a variety of stimuli that have evolved in humans that are originally thought to be survival traits. Among the relevant stimuli is the ability to observe changes in object contrast against a background, motion and rate. These aircraft characteristics combine to form Observed Motion Energy (OME). Reference 8 also quantifies these characteristics as Visual Cross Section (VCS).

SUMMARY OF THE DISCLOSURE

In some embodiments, an aerial vehicle includes a fuselage and an electronics assembly connected to the fuselage. A plurality of flexural wings are configured to oscillate during flight. The aerial vehicle includes at least one motor and a rotor driven by the motor. In some embodiments, a flight control system is connected to the motor and the rotor. The flight control system induces oscillatory motions in the plurality of passive flexural wings by dynamic variations in in rotor speeds of the rotor and variations in thrust levels.

In other embodiments, a wing for an aerial vehicle includes a passive flexural wing. The passive flexural wing has a natural frequency for panel flutter of between 0.01 Hz and 15 Hz. A wing spar is attached to the passive flexural wing.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other advantages and features of the disclosure can be obtained, a more particular description will be rendered Though some elements in some figures have the same reference number as elements in other figures, these elements may be the same or may differ. While some of the drawings are schematic representations of concepts, at least some of the drawings may be drawn to scale. Understanding that these drawings depict only typical embodiments of the disclosure and are not therefore to be considered to be limiting of its scope, the embodiments will be described and explained with additional specificity and detail through the use of the accompanying drawings in which.

DETAILED DESCRIPTION OF EXEMPLARY EMBODIMENTS

Figure 1:
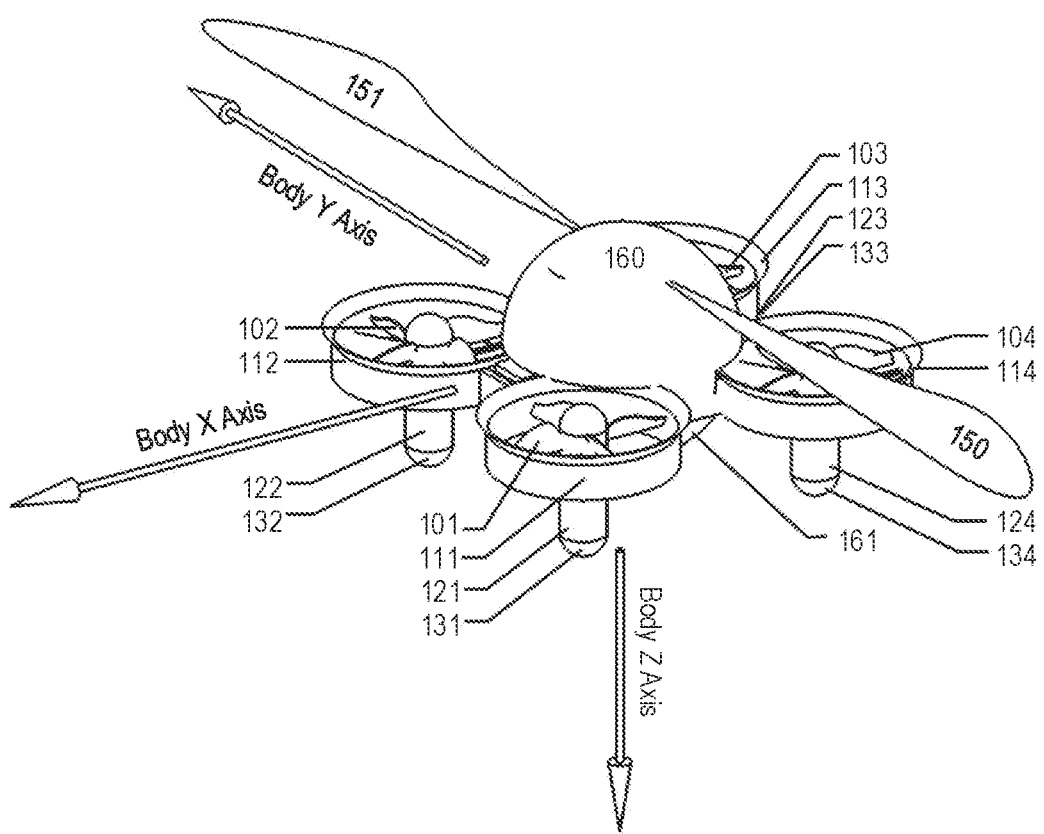
FIG. 1 Shows an example of a flying feathered ball configured aerial vehicle with dynamic feather wings and fuselage displaying the current innovation with body axes for reference.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure generally relates to flexural motions of aerial vehicle structures and ways to generate said motions so as to enhance visibility and perception of the flight state of the entire vehicle. The present disclosure employs a variety of dynamic structural, visual and aeromechanical features in combination so as to maximize the OME and VCS while not using any motor device to directly manipulate said feature. In some embodiments, structural motions of an observable appendage or surface are oscillated between 0.01 Cycles per Second (Hz) and 15 Hz. This oscillation frequency may increase the OME and VCS. In some embodiments, visible elements of the drones disclosed herein may have a high relative contrast against the observed background. For example, during daylight hours curvilinear surfaces may generate glint reflections from sunlight or artificial lights and/or small specular reflective components like "glitter" on aircraft surfaces. These reflective surfaces are designed to move within the prescribed frequency band of 0.01 and 15 Hz, typically by possessing structural and aeromechanical natural frequencies within that bandwidth range when airborne. At night, the structures of the drone may be illuminated artificially by light sources mounted on the aircraft thereby generating observed oscillations within the range of improved OME and VCS of 0.01-15 Hz. In some embodiments aeromechanical propulsors, an appropriately designed feedback loop, and the aerodynamics and aeromechanics of flight may intentionally excite the natural frequencies in the structures of interest to generate suitable vehicle and structural motions via dynamic thrust and moment variations. In accordance with at least one embodiment of the present disclosure, no motor, pushrod, linkage or other device may be used to actively manipulate the observable appendage or surface relative to the aircraft fuselage or body. Rather, the observable appendages and/or surfaces are moved by the natural motions in the surfaces, typically stemming from excitation at one or more natural frequencies, and variations in lift propulsor thrust to excite said natural structural and aeromechanical vibration modes. These natural motions are often referred to as "resonance modes," "flutter," and/or "buffet."

FIG. 1 shows a flying feathered ball configured aerial vehicle with body cardinal axes, X, Y, and Z with origins at the aircraft center of gravity as defined by Roskam and Etkin. The X axis positive convention is extending forward of the direction that is considered the "front" of the aircraft. The body Y axis extends from the center of gravity to the right. The body Z axis given a right-handed system extends downwards from the center of gravity. While the aircraft shown has four rotor-motor-rotor guard assemblies, the aircraft can have any number of such assemblies in any orientation.

The present innovation, the enhanced visibility aircraft shown in its preferred embodiment has a body including rotors (e.g., propellers), 101, 102, 103, 104, rotor guards (e.g., propeller guards) 111, 112, 113, 114, motors 121, 122, 123, 124, and end caps 131, 132, 133, 134 on the lower ends of the motors, doubling as undercarriage landing pads. Typically opposing rotors are handed in the same direction and handed in the opposite direction as the orthogonal rotors. For instance, rotors 102 and 104 are shown as being right-handed while rotors 101 and 103 are shown as being left-handed. However, it should be understood that the opposite arrangement (e.g., rotors 102 and 104 left-handed and rotors 101 and 103 right-handed) may also be utilized. The upper fuselage shell 160 supports passive flexural wings 150, 151. The passive flexural wings 150, 151 may be designed to flex and move without the aid of direct mechanical linkage to any motive element, such as one or more motors, pushrods, linkages or the like. For example, the passive flexural wings are designed to oscillate using thrust variations generated by variations in the speeds of rotors, 101, 102, 103, 104, and air flowing over them during flight. In some embodiments, the flexural wings may oscillate at a rate of between 0.01 and 15 Hz.

Figure 2:
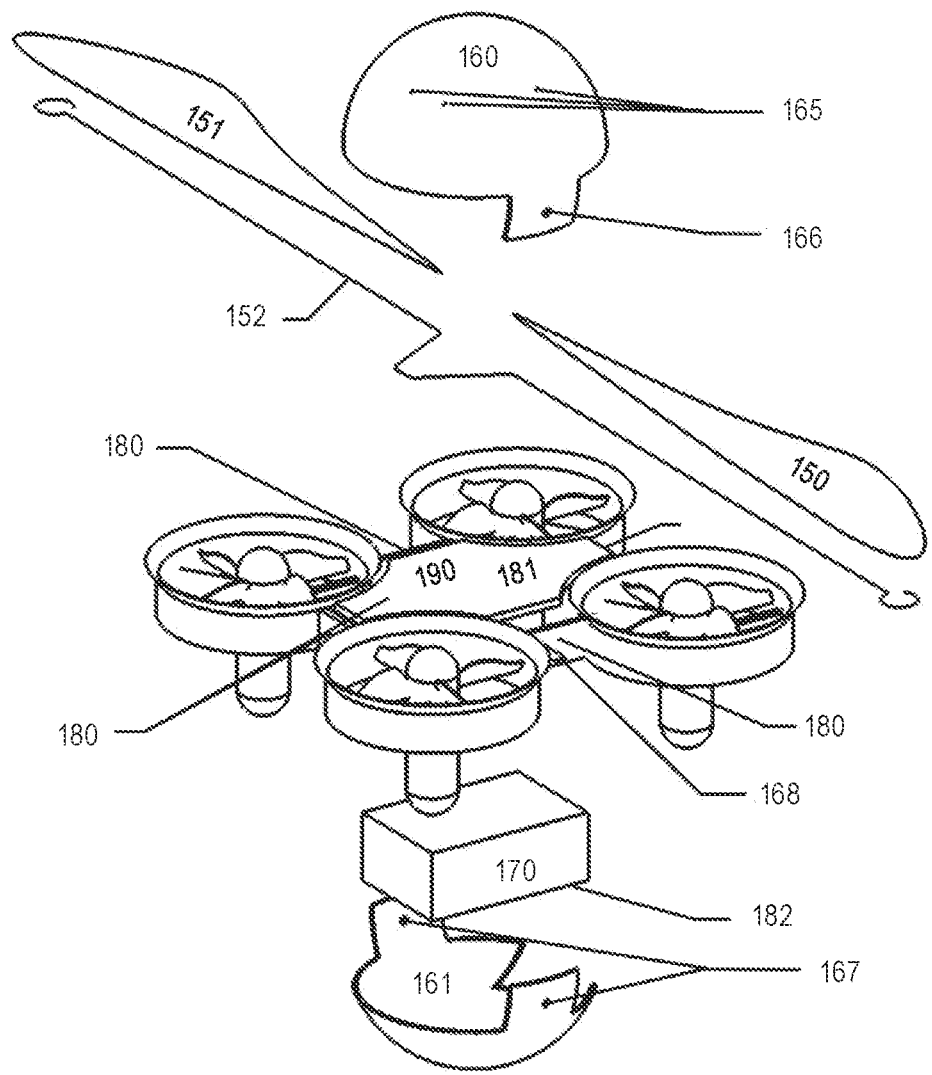
FIG. 2 Shows an example of a flying feathered ball configured aerial vehicle exploded view showing a wing wire structural spar supporting the flexurally dynamic wings.

FIG. 2 shows an exploded view of an aerial vehicle, according to at least one embodiment of the present disclosure. The aerial vehicle shown is in a flying feathered ball configuration. The lower fuselage shell 161 mates to the frame 180 at structural connection points 168. The lower fuselage shell 161 may mate to the frame 180 using any connection mechanism, such as pin-and-hole joints, with fasteners like screws or rivets, thermoplastically welded, bonded with a resin, any other connection mechanism, and combinations thereof. The battery bay 170 accommodates at least one battery 182 to power the motors. The battery bay 170 may be structurally integrated with the frame 180.

In some embodiments, the frame may accommodate and/or support of lights, often in the form of light emitting diodes (LEDs). The lights may be located on any of the structural components of the frame. In accordance with at least one embodiment of the present disclosure, the frame may accommodate and/or support any number of separate lights, including lights supported on the upper fuselage shell 160, the lower fuselage shell 161, the battery bay 170, the motors 121, 122, 123, 124, the end caps 131, 132, 133, 134, the passive flexural wings 150, 151, the main wing spar 152, the frame 180, the flight control system board 190, any other portion of the aerial vehicle, and combinations thereof. An electronics assembly 181 is mounted on the flight control system (FCS) board 190. The electronics assembly 181 may include a flight controller, control of the lights, control of the motors 121, 122, 123, 123, communication elements with a remote control, any other electrical components, and combinations thereof. The electronics assembly 181 may include one or more computing devices, attitude sensors, communication elements, and so forth. The electronics assembly may receive remote control commands from a remote operator. For example, receipt of the remote-control commands may include receipt of one or more commands that may cause the electronics assembly 181 to adjust operation of the motors and/or propellers. In some embodiments, the rotor may be configured to, in response to a command to the motor by the electronics assembly (which may be received by one or more remote control commands), provide at least one of lifting thrust, pitch control, yaw control, and/or roll control.

Lifting thrust may be adjusted by adjusting the rotor speed of the rotor. Pitch control, yaw control, and/or roll control may be adjusted by adjusting one or more turning vanes and/or by adjusting the relative rotation of rotors.

The upper fuselage shell 160 is joined to the lower fuselage shell 161 and the frame via attach points 166 and 167, at the fuselage structural connection points 168. The upper fuselage shell 160 has attach points which may take the form of holes 165 wherein the main wing spar 152 goes. The upper fuselage shell 160 and lower fuselage shell 161 may be coated with any form of paint, metallization or glitter to enhance observability.

In some embodiments, the main wing spar 152 may be attached to the outside of the upper fuselage shell 160. In some embodiments, the main wing spar 152 may not penetrating the outer mold line of the hemisphere. In some embodiments, the main wing spar 152 may penetrate the upper fuselage shell 160 any number of times with or without structural bonding to the inside of the hemisphere. The main wing spar 152 is composed of one or multiple structural materials or may be formed from multiple separate structural elements. The main wing spar 152 may loop within the upper fuselage shell 160 any number of times and may support other internal components.

The main wing spar 152 is attached to the passive flexural wings 150, 151. In some embodiments, the chordwise position of the attachment to the passive flexural wings 150, 151, to the wing spar 152 may be from the leading to the trailing edge. In some embodiments, the spanwise position of the attachment (e.g., the spanwise attachment line) may lay between the leading edge and the half-chord. As discussed herein, the membrane of the passive flexural wings 151 may be flexible. Based on this membrane flexibility, panel flutter of the passive flexural wings 151 may be induced during flight. This panel flutter may enhance visibility by reflecting and/or directing light to a viewer's eyes. The natural frequency of the panel flutter may be between 0.01 Hz and 15 Hz, based on the flight of the aerial vehicle and/or the vibrations or other motions of the motors 121, 122, 123, 124. In some embodiments, coupled first-flap flutter and/or buffet will be excited during flight, again between the 0.01-15 Hz natural frequency range.

The main spar may be attached to the passive flexural wings with any of an assortment of resins including thermoplastic, thermoset, elastomeric, silicone, urethanes, polyurethanes, any other resin or connection mechanism, and combinations thereof. The main spar 152 is designed to flex in the spanwise direction and chordwise direction as well as to allow for camber and twist deflections. Such flexure may occur based on naturally occurring vibrations, thereby enhancing the visibility of the entire aerial vehicle. The wing membranes, 150, 151 are designed to flex in any direction, including a spanwise direction, a chordwise direction, and twist. The positioning of the main spar with respect to the chordwise line of aerodynamic centers of the wing membranes may be such that flutter motions are induced.

The assembled wing and passive flexural wings possess natural frequencies both statically and while airborne between 0.01 and 15 Hz. When airborne, the natural frequencies may change based on to the coupled aeromechanics of the aircraft. In some embodiments, the natural frequencies of the membranes may remain within 0.01 Hz and 15 Hz during flight. Aerodynamic forces (e.g., forces occurring during flight, while the aerial vehicle is off the ground or while the rotors are rotating), aeromechanical vibrations, and/or inertial motions and excitation vibrations associated with motion of flight and flow through the rotors may excite the combined wing assemblies in first and seconding flap modes as well as first chordwise bending. Variations in thrust produced by the rotors may also induce vibrations of the membranes. Such dynamic flexures may enhance glint and dynamic reflectivity of the wing membranes and may take place in hover (e.g., hovering flight), forward flight, static flight, or any other flight mode. In some embodiments, the wing assemblies may dynamically respond to greater or lesser amounts of rotor inflow going through the multiple rotor assemblies. In some embodiments, the dynamic flexures may occur during moving flight at nonzero ground or airspeeds.

Figure 3:
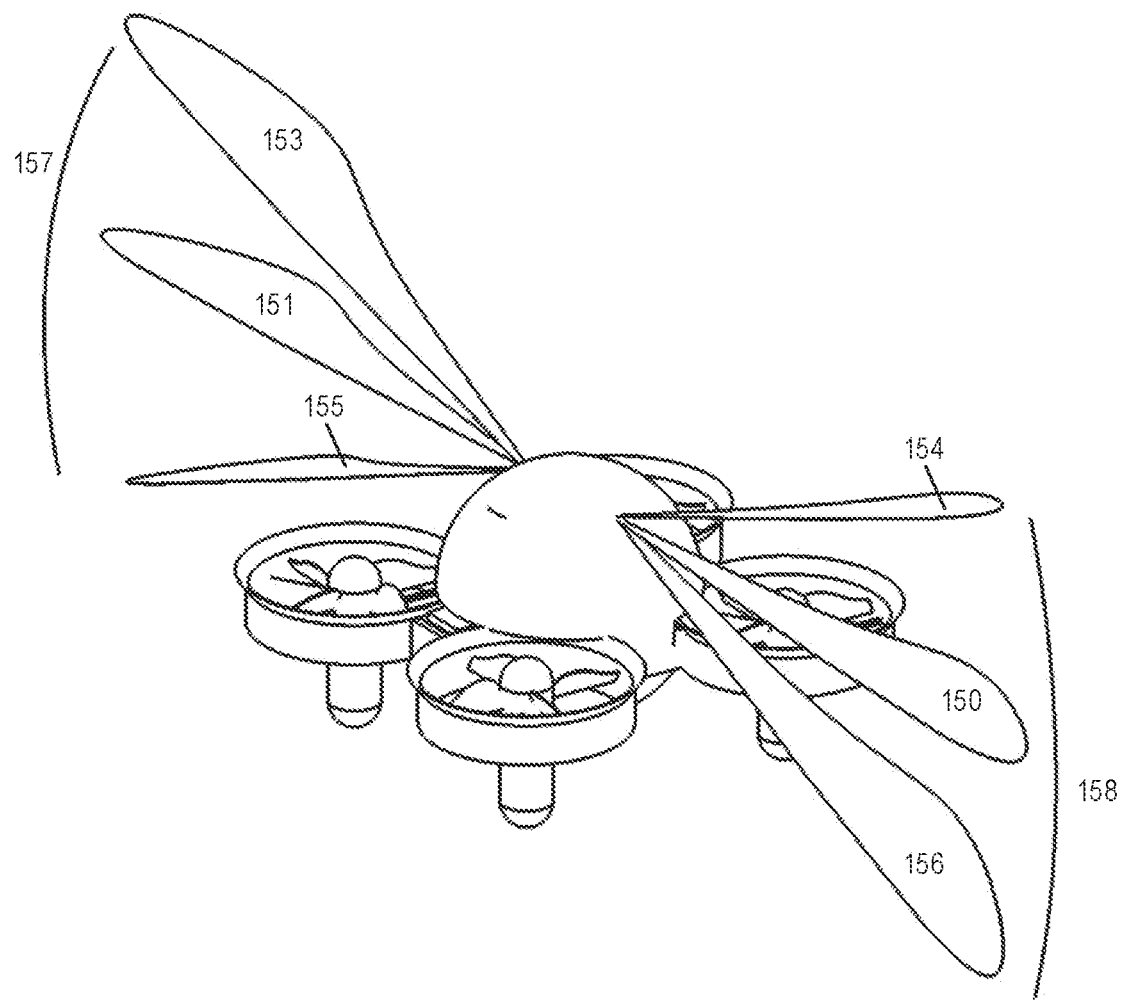
FIG. 3 Shows an example of a flying feathered ball configured aerial vehicle with flexurally dynamic wings deflecting in flap mode.

FIG. 3 is a representation of an aerial vehicle having passive flexural wings 150, 151 undergoing flap motions, according to at least one embodiment of the present disclosure. In some embodiments, the passive flexural wings 150, 151 may flex in a continuum (e.g., continuously between the positions shown in FIG. 3. In some embodiments, the passive flexural wings 150, 151 may hinged at any point or bend at any point across their surface with any form of flexural material.

In the view shown, the right wing (e.g., passive flexural wing 150) flexes between a lower position 156, a middle position (represented by the neutral position of the passive flexural wing 150), and an upper position 154. The left wing (e.g., passive flexural wing 151) the flexes between a lower position 155, a middle position (represented by the neutral position of the passive flexural wing 151), and an upper position 153. The left wing strokes through a left wing stroke range 157. The right wing may stroke through a right wing stroke range 158. In some embodiments, the left wing stroke range 157 may be the same as the right wing stroke range 158.

It should be noted that the wings may flap in unison such that the left wing and right wing go up and down at the same time or approximately the same time. It should also be noted that the wings may oscillate up and down in opposition such that as the right wing is going up relative to the airframe, the left wing is going down relative to the airframe. Such symmetric and/or antisymmetric flapping may occur with a frequency between 0.01 and 15 Hz. In some embodiments, the wings may flap at the same frequency. In some embodiments, the wings may flap with different frequencies. For example, a first wing flap may occur at approximately 1 Hz, and a second wing may flap at approximately 8 Hz. In some embodiments, the flapping frequencies of the wings may be designed specific to a particular aircraft. For example, the flapping frequencies for the individual wings may be based on the natural frequency of the wings, based on the shape, material, and/or structure of the wings and other elements of the aerial vehicle. These motions are specifically designed into the entire aircraft and typically occur at structural natural frequencies. Given that the aircraft will be experiencing free-flight aeromechanical modes, the static, natural frequencies measured on the ground will be different that free-flight frequencies as body plunge, surge and rock modes also participate in the motions. In some embodiments, the aeromechanical frequencies of the wings may range between 0.01 to 15 Hz. These natural vibration modes are excited by thrust variations induced by varying the speed of the rotors 101, 102, 103, 104 and by air flowing over said surfaces during hover (e.g., hovering flight), static flight, on the ground, and/or different flight modes. In some embodiments, the natural vibrations may occur during moving flight at nonzero ground or airspeeds.

Figure 4:
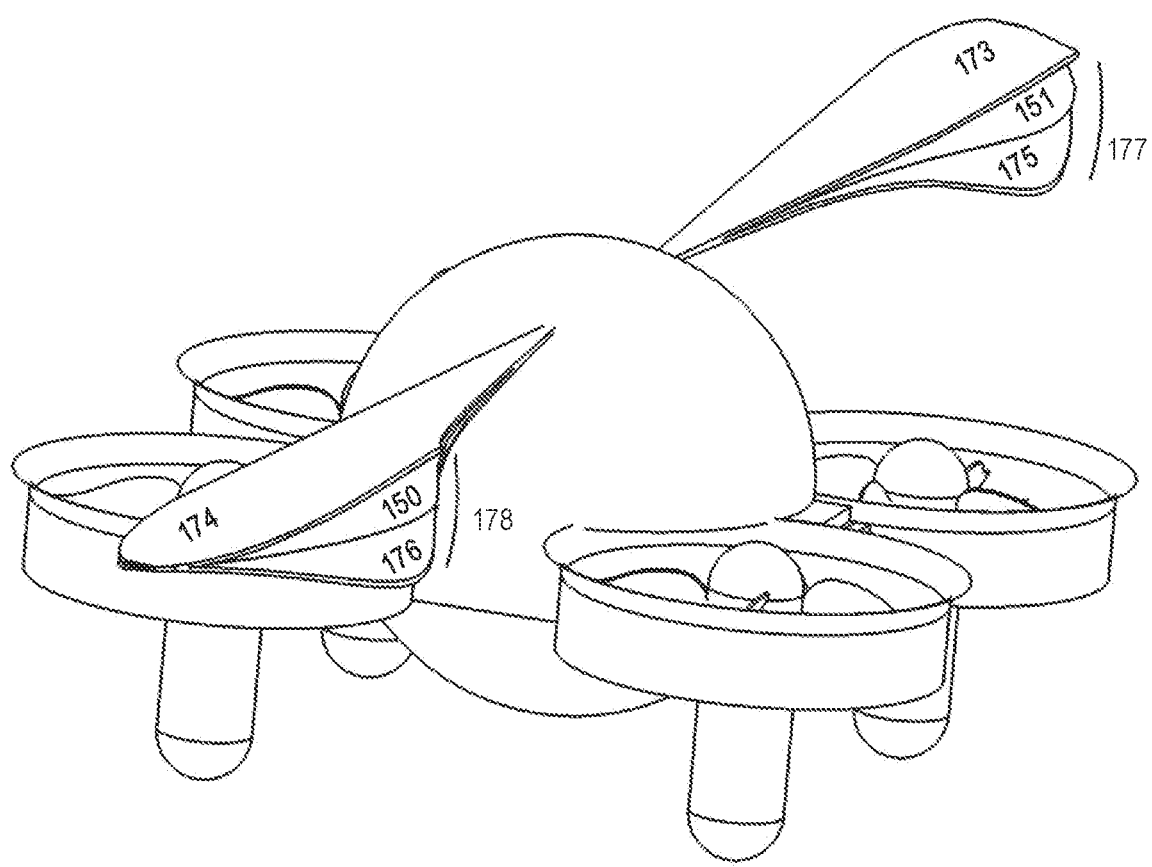
FIG. 4 Shows an example of a flying feathered ball configured aerial vehicle with flexurally dynamic wings deflecting in camber mode.

FIG. 4 is a representation of passive flexural wings 150, 151 flexing in chordwise flap, according to at least one embodiment of the present disclosure. The aerial vehicles of the present disclosure may utilize uses no direct mechanical linkages, pushrods, cams or gears to induce these deflections. In some embodiments, the motions may be induced naturally by the natural frequencies of the wings in flap being in a range which are excited by the airflow over them in flight and by thrust variations (e.g., by variations in the forces on the aerial vehicle caused by thrust from the motors and/or rotors).

In accordance with at least one embodiment of the present disclosure, the trailing edges of the passive flexural wings 150, 151 may flex between a downward position 175, 176, a neutral position (represented by the neutral position shown by the passive flexural wings 150, 151), and an upward position 173, 174. For example, the passive flexural wings 150, 151 may flex downward to the downward position 175, 176 and the flexure of the membrane may recover into the neutral position. The passive flexural wings 150, 151 may flex upward to the upward position 173, 174 and the flexure of the membrane may recover to the neutral position. These chordwise flap deformations occur through stroke ranges 177, 178. Because the flap deflections occur passively and are not driven by direct mechanical linkages, they may occur in synch with one another, that is going trailing edge up and down at the same time. They may also deflect anti-symmetrically, that is going trailing edge up while the other membrane deflects trailing edge down. The wings may also simultaneously flap up and down as shown in FIG. 3 while undergoing camber deflections of FIG. 4.

Figure 5:
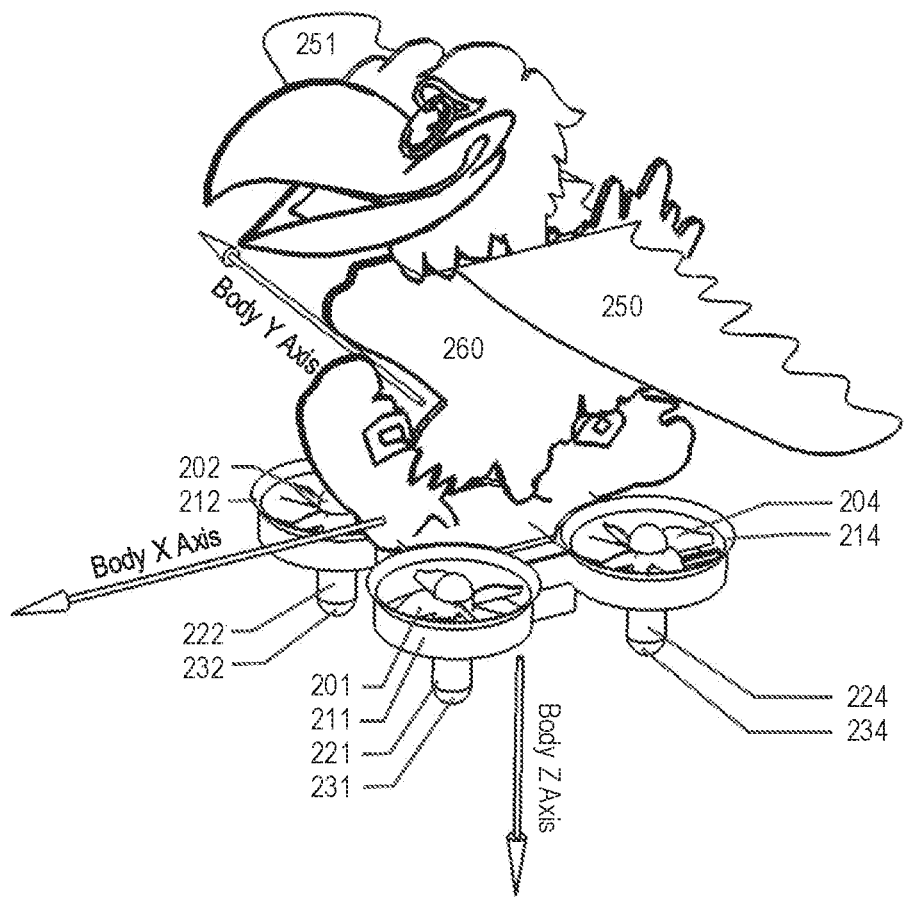
FIG. 5 Shows an example of a flying mascot configured aerial vehicle with dynamic feather wings and fuselage displaying the current innovation with body axes for reference.

FIG. 5 is a representation of an aerial vehicle in the form of a flying mascot, according to at least one embodiment of the present disclosure. The body axes (e.g., the body x axis, the body y axis, and the body z axis) have the same orientation as those described in FIG. 1. The rotor assemblies are composed of rotors 201, 202, 203, 204 which are held within rotor guards 211, 212, 214 driven by motors 221, 222, 224, which sit above the end caps 231, 232, 234. The mascot body 260 is attached to the rotor assemblies via the frame. The passive flexural wings 250, 251 are attached to the body by a flexible main spar.

Figure 6:
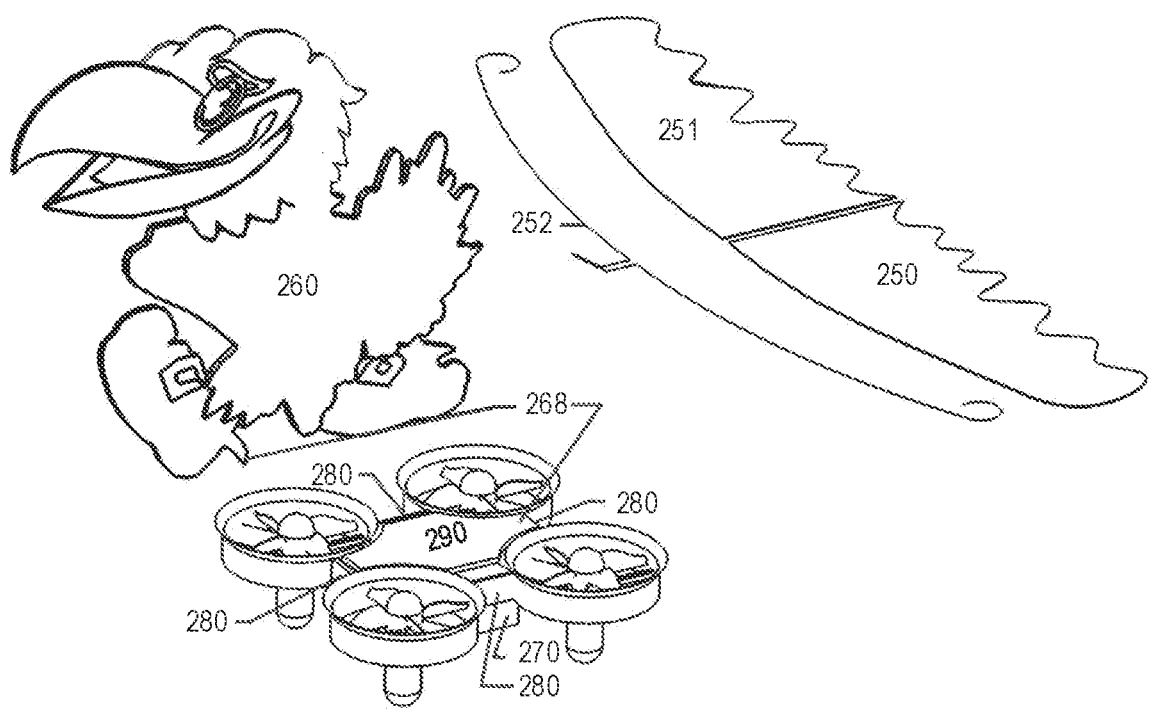
FIG. 6 Shows an example of a flying mascot configured aerial vehicle exploded view showing a wing wire structural spar supporting the flexurally dynamic wings.

FIG. 6 shows an exploded view of the flying mascot of FIG. 5. The rotor assemblies are attached to the frame 280. The frame 280 further supports a battery bay 270. A flight control system (FCS) board 290 houses the electronics responsible for receiving radio control commands, inertially sensing the aircraft attitude and delivering commands to the motors and is mounted to the frame 280. The mascot body 260 is attached to the frame and board at connection area 268. The connection area 268 may be formed from a fillet of resin or another material which is capable of transferring loads between the frame 280 and the mascot body 260. For example, the connection area 268 may include filled epoxy, thermoplastic thermoset resin, any other connection mechanism, and combinations thereof.

The main wing spar 252 may be attached to the passive flexural wings 250, 251. The chordwise position of the attachment to the passive flexural wings 250, 251, to the main wing spar 252 may be from the leading to the trailing edge. The spanwise attachment line may be between the leading edge and the half-chord. Given the flexibility of the membrane, panel flutter will be induced during flight, thereby enhancing visibility. The natural frequency of the panel flutter may be between the 0.01-15 Hz range. In some embodiments, coupled first-flap flutter and/or buffet will be excited during flight, again between the 0.01-15 Hz natural frequency range. The main spar may be attached to the passive flexural wings with any of an assortment of resins, including thermoplastic, thermoset, elastomeric, silicone, urethanes, polyurethanes, any other resin, and combinations thereof.

The main wing spar 252 may be designed to flex in the spanwise and chordwise directions as to allow for camber and twist deflections. This flexure may occur based on occurring vibrations to enhance the visibility of the entire aircraft. The passive flexural wings 250, 251 may be configured to flex in any direction, including spanwise, chordwise, and twist. The positioning of the main spar with respect to the chordwise line of aerodynamic centers of the wing membranes may be such that flutter motions are induced. The assembled wing and passive flexural wings possess natural frequencies both statically and while airborne between 0.01 and 15 Hz. When airborne, the natural frequencies may change based on the coupled aeromechanics of the aircraft. In some embodiments, the natural frequencies may be within the 0.01 to 15 Hz frequency band during flight. Aerodynamic forces, aeromechanical vibrations, and/or inertial motions and excitation vibrations associated with motion of flight and flow through the rotors will excite the combined wing assemblies in first and seconding flap modes as well as first chordwise bending. Variations in thrust produced by the rotors will also induce vibrations of the membranes. Such dynamic flexures are intended to enhance glint and dynamic reflectivity of the wing membranes and may take place in hover (e.g., hovering flight), static flight, forward flight or any other flight mode. In some embodiments, the dynamic flexures may occur during moving flight at nonzero ground or airspeeds. The wing assemblies are also designed to dynamically respond to greater or lesser amounts of rotor inflow going through the multiple rotor assemblies.

Figure 7:
FIG. 7 Shows an example of a flying mascot configured aerial vehicle with flexurally dynamic wings deflecting in flap mode.

FIG. 7 is an illustration of the mascot aerial vehicle of FIG. 5 undergoing flap motions. The wings may flex in a continuum or be hinged at any point with any form of flexural material. The right wing flexes between a lower position 256, through a middle position (illustrated by the neutral position of the passive flexural wing 250), and an upper position 254. The left wing flexes between a lower position 255, a middle position (illustrated by the neutral position of the passive flexural wing 251), and an upper position 253. The right wing strokes through a right stroke range 258 and the left wing strokes through a left stroke range 257. It should be noted that the wings may flap in unison such that the left wing and right wing go up and down at nearly the same time.

In some embodiments, the passive flexural wings 250, 251 may oscillate up and down in opposition such that as the right wing is going up relative to the airframe, the left wing is going down relative to the airframe. This symmetric and antisymmetric flapping may occur between 0.01 and 15 Hz. In some embodiments, the flapping of the passive flexural wings 250, 251 may occur at the same frequency. In some embodiments, the flapping of the passive flexural wings 250, 251 may occur at different frequencies. For example, a first wing may flap at approximately 1 Hz, while a second wing may flap at approximately 8 Hz.

The flapping frequencies of the passive flexural wings 250, 251 may be specifically designed into the entire aircraft and occur at structural natural frequencies. Given that the aircraft will be experiencing free-flight aeromechanical modes, the static, natural frequencies measured on the ground may be different than free-flight frequencies as body plunge, surge and rock modes also participate in the motions. In some embodiments, the aeromechanical frequencies of the aerial vehicle on the ground, and in flight may range from 0.01 to 15 Hz. These natural vibration modes are excited by thrust variations induced by varying the speed of the rotors 201, 202, 203, 204 and by air flowing over said surfaces during hover (e.g., hovering flight), static flight, on the ground, and/or different flight modes. In some embodiments, the natural vibration modes may occur during moving flight at nonzero ground or airspeeds.

Figure 8:
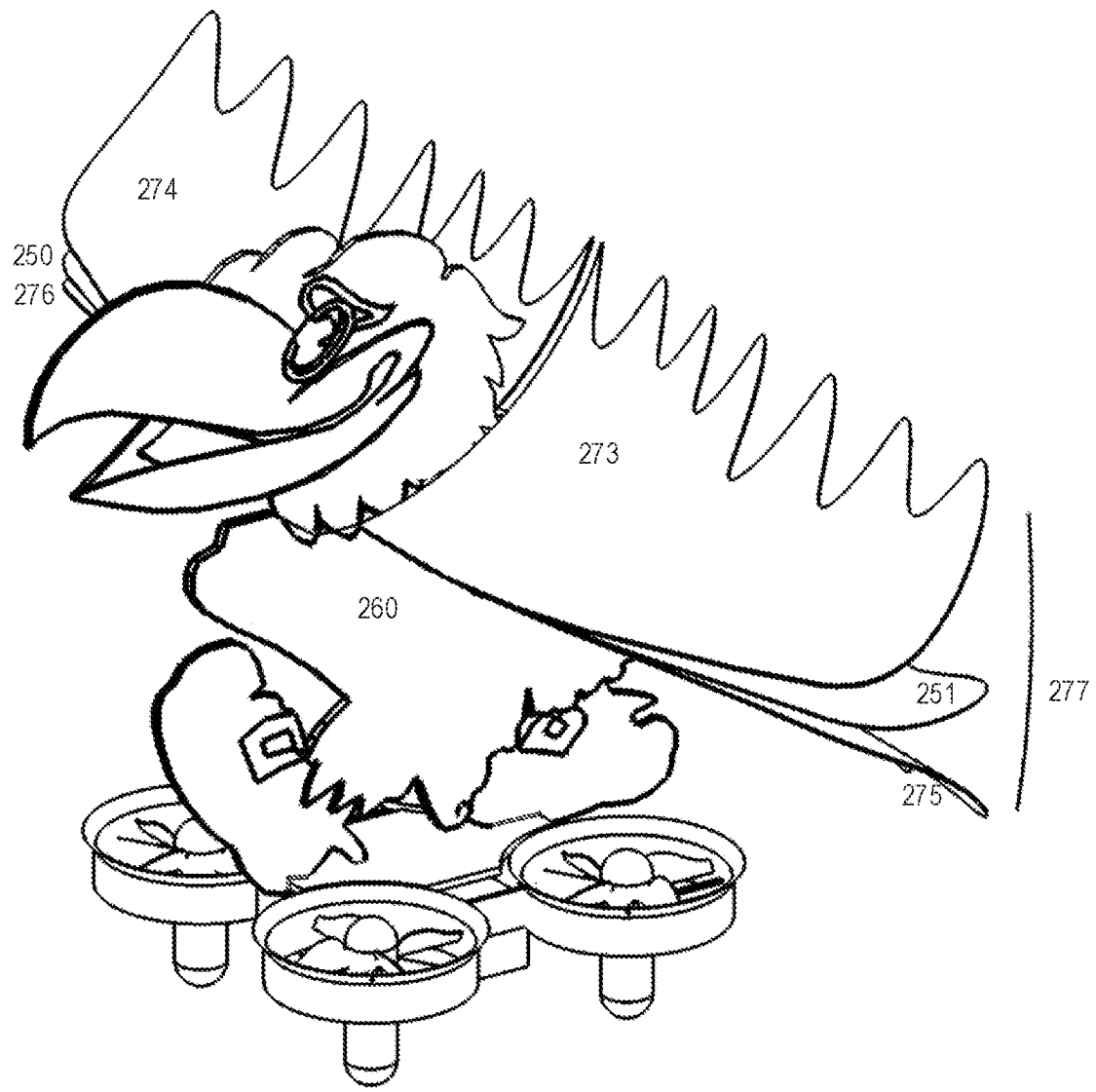
FIG. 8 Shows an example of a flying mascot configured aerial vehicle with flexurally dynamic wings deflecting in camber mode.

FIG. 8 shows the flexible membrane wings flexing in chordwise flap of the mascot of FIG. 5. The passive flexural wings 250 may use no direct mechanical linkages, pushrods, cams or gears to induce these deflections. In some embodiments, the chordwise flap motions may be induced naturally by the natural frequencies of the wings in flap being in a range which are excited by the airflow over them in flight and by thrust variations. The trailing edges of the membrane wings deflect between the downward position 275, 276, a neutral position (illustrated by the position of the passive flexural wings 250, 251), and an upward position 273, 274.

In some embodiments, the passive flexural wings 250, 251 may flex to the downward position 275, 276, and the membrane may relax to move the passive flexural wings 250, 251 to the neutral position. In some embodiments, the passive flexural wings 250, 251 may flex to the upward position 273, 274 and the membrane may relax to move the flexible membrane wings to the neutral position. These chordwise flap deformations occur through stroke ranges 277, 278. Because the flap deflections occur passively and are not driven by direct mechanical linkages, they may occur in synch with one another, that is going trailing edge up and down at the same time. They may also deflect anti-symmetrically, that is going trailing edge up while the other membrane deflects trailing edge down. The wings may also simultaneously flap up and down as shown in FIG. 7 while undergoing camber deflections of FIG. 8. It should be noted that the serrated trailing edge of the flexible membrane wing allows for each lobe to independently deflect with respect to the others. This enhances the visibility of the flexible membrane wing and will occur at different chordwise frequencies given differences in lobe length and modal masses. The wing will also be flexible in torsion and allows for camber flap deflections in response to throttle settings.

Figure 9:
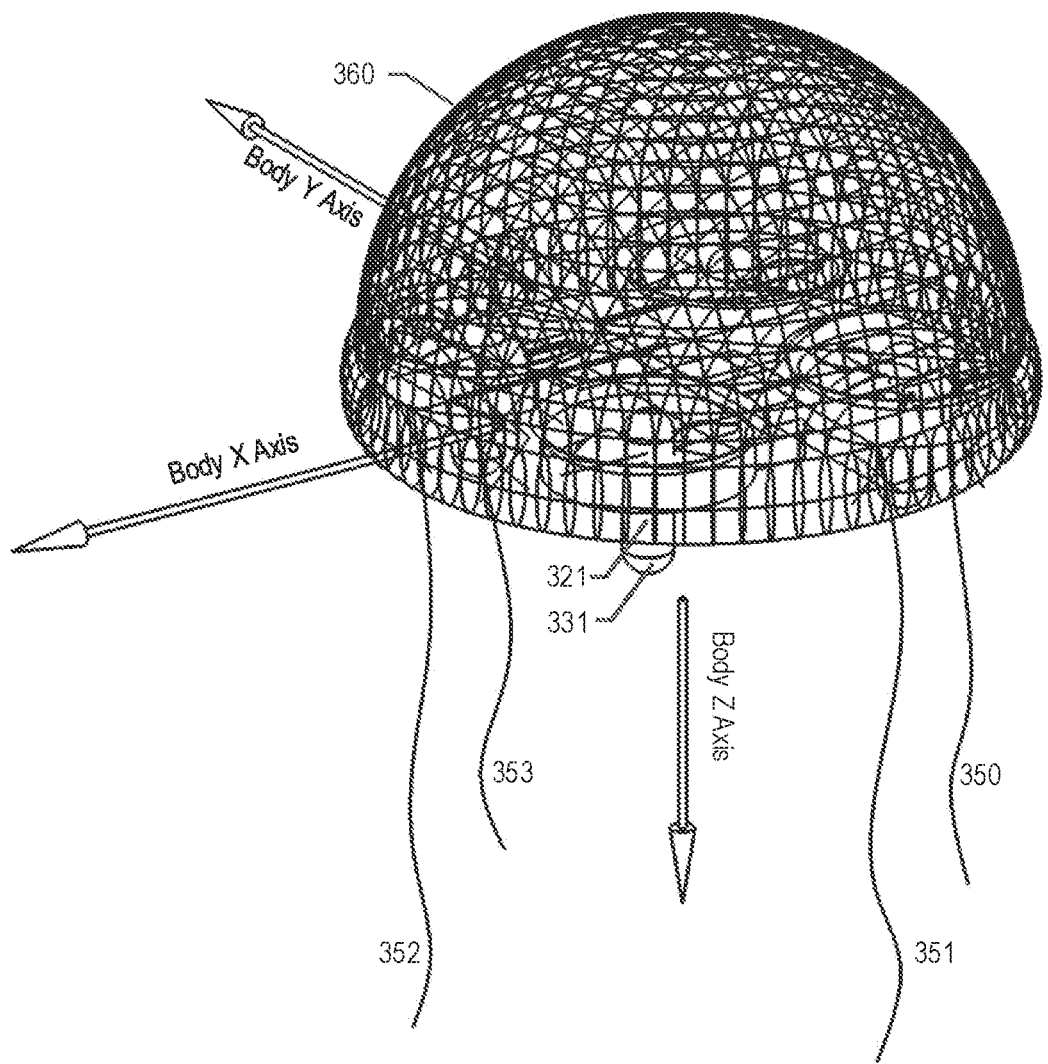
FIG. 9 Shows an example of a flying jellyfish configured aerial vehicle with dynamic tentacles and fuselage displaying the current innovation with body axes for reference.

FIG. 9 shows an aerial vehicle configured as a jellyfish, according to at least one embodiment of the present disclosure. The jellyfish aerial vehicle has body cardinal axes, X, Y, and Z with origins at the aircraft center of gravity. The X axis positive convention is extending forward of the direction that is considered the "front" of the aircraft. The body Y axis extends from the center of gravity to the right. The body Z axis given a right-handed system extends downwards from the center of gravity. While the aircraft shown has four rotor-motor-rotor guard assemblies, the aircraft can have any number of such assemblies in any orientation.

The jellyfish aerial vehicle shown has a body including rotors (see FIG. 10), 301, 302, 303, 304, rotor guards (see FIG. 10) 311, 312, 313, 314, motors 321, (see FIG. 10) 322, 323, 324, and endcaps 331, (see FIG. 10) 332, 333, 334 on the lower ends of the motors. In some embodiments, the endcaps 331, 332, 333, 334 may also be undercarriage landing pads. Typically opposing rotors are handed in the same direction and handed in the opposite direction as the orthogonal rotors. For instance, rotors 302 and 304 are shown as being right-handed while rotors 301 and 303 are shown as being left handed. The opposite arrangement may also be utilized.

The mesh dome 360 supports passive flexural tentacles 350, 351, 352, 353 which are designed to flex and move without the aid of direct mechanical linkage to any motors, pushrods, linkages or the like. For example, the passive flexural wings are designed to oscillate between 0.01 and 15 Hz by using thrust variations generated by variations in the speeds of rotors 301, 302, 303, 304, and air flowing over them during flight.

Figure 10:
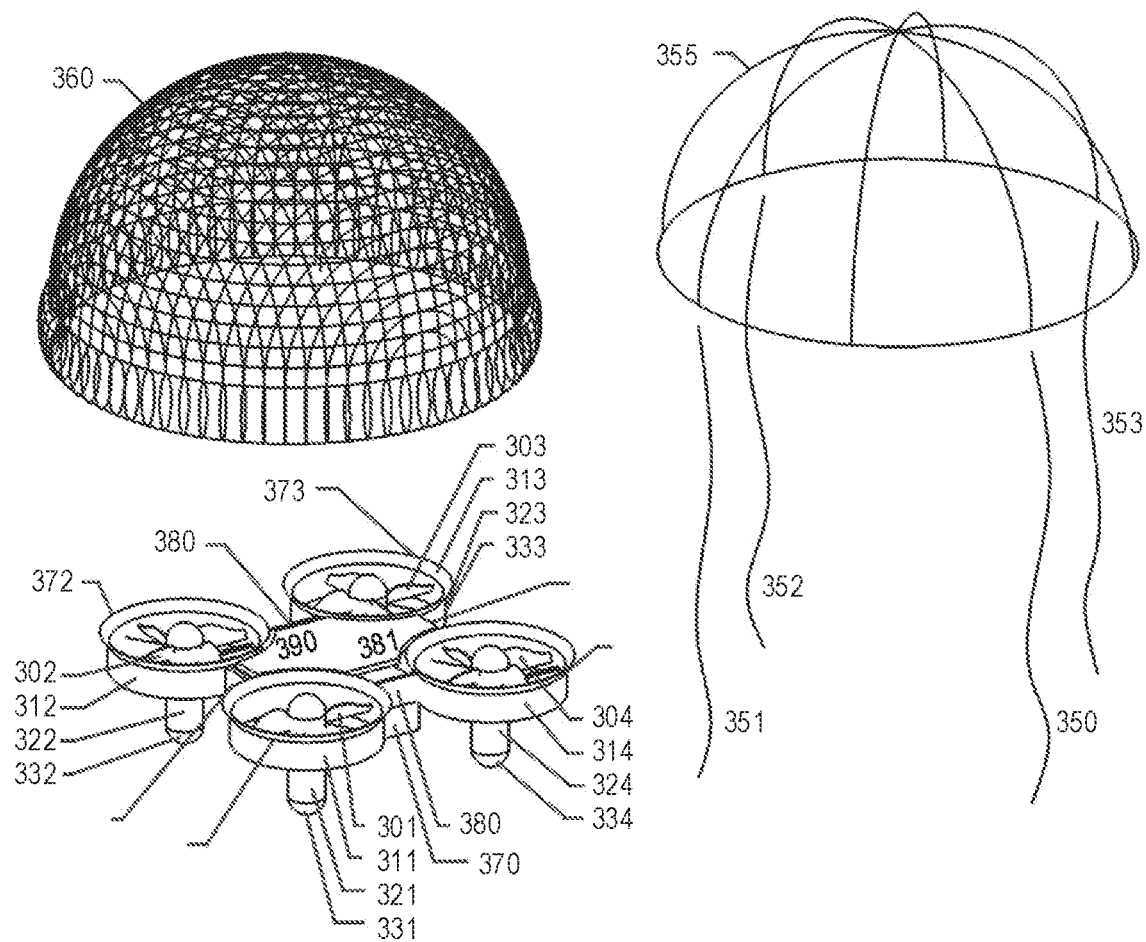
FIG. 10 Shows an example of a flying jellyfish configured aerial vehicle exploded view showing a wire frame supporting the umbrella and flexurally dynamic tentacles.

FIG. 10 shows an exploded view of the jellyfish aerial vehicle of FIG. 9. The mesh dome 360 mates to the wireframe 355 by covering it. The wireframe 355 mates in turn with the extremities of the four rotor guards 311, 312, 313, 314. These mating points may be via pin-and-hole joints, with fasteners like screws or rivets, thermoplastically welded, bonded with any form of resin, with any other connection mechanism, and combinations thereof. They may also be stitched connections as may be the connection between the mesh dome 360 and the wireframe 355.

The battery bay 370 accommodates at least one battery and is structurally integrated with the frame assembly 380. The frame may accommodate any number of lights, often in the form of light emitting diodes (LEDs) on any of the structural components of the frame. An electronics assembly 381 is mounted on the flight control system (FCS) board, 390. The four passive flexural tentacles 350, 351, 352, 353 are mounted to the frame by any of a number of structural connection members including a knot, resin of any kind, mechanical fasteners, any other connection mechanism, and combinations thereof. Given the flexibility of the passive tentacles, flutter will be induced during flight, thereby enhancing visibility. The natural frequency of the panel flutter is between the 0.01-15 Hz range. The visibility of the passive flexural tentacles 350, 351, 352, 353 and mesh dome 360 may be enhanced by the use fluorescent paints, dies, LEDs and/or glitter. They are designed to move in response to the motion of the surrounding air and the motions of the vehicle itself.

Figure 11:
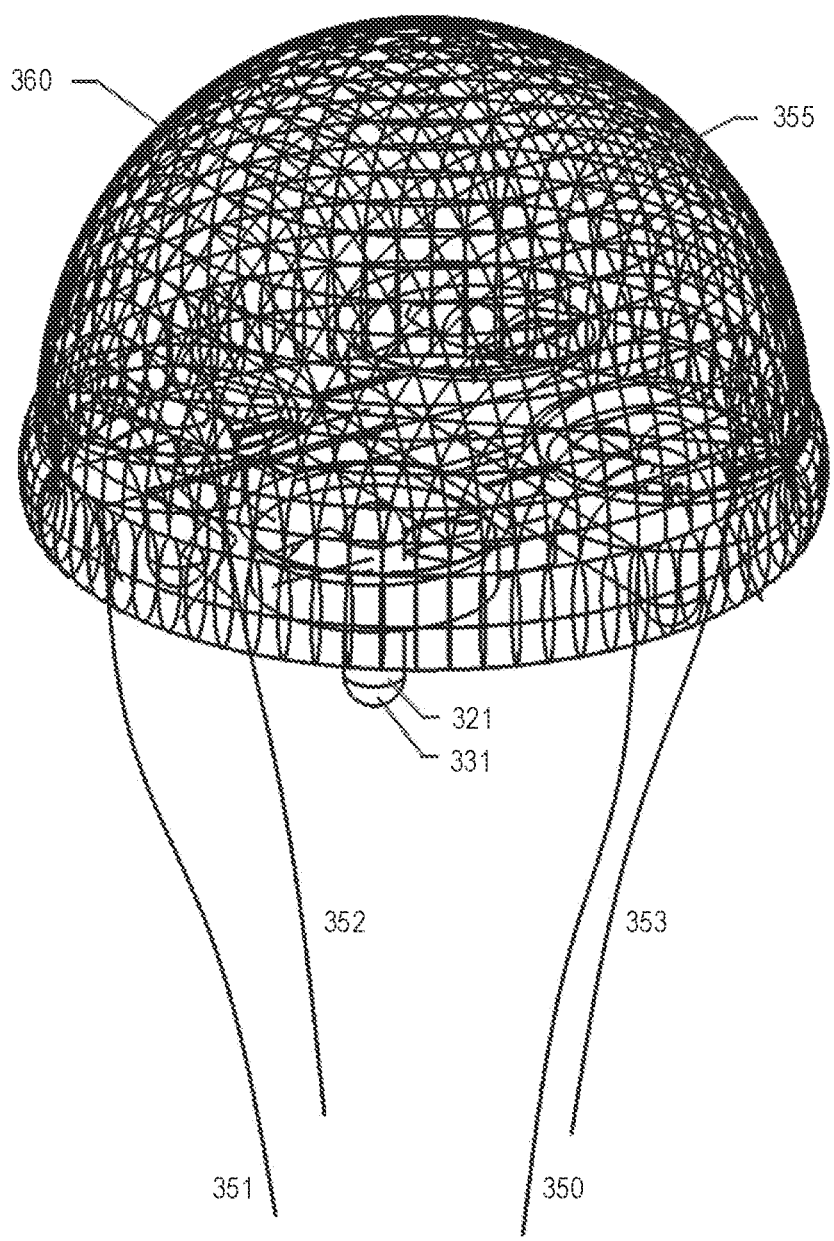
FIG. 11 Shows an example of a flying jellyfish configured aerial vehicle with flexurally dynamic tentacles deflecting down during upward accelerations.

FIG. 11 shows the jellyfish aerial vehicle of FIG. 9 moving in vertical ascending flight. The mesh dome 360 is attached to the wireframe 355 which supports passive flexural tentacles 350, 351, 352, 353. It should be noted that as the aircraft ascends, the rotorwash coming from rotors 301, 302, 303, 304, driven by motors 321, 322, 323, 324, induces a net wake contraction. This wake contraction causes the flexible tentacles to straighten out and move towards the body Z axis during vertical accelerated flight.

Figure 12:
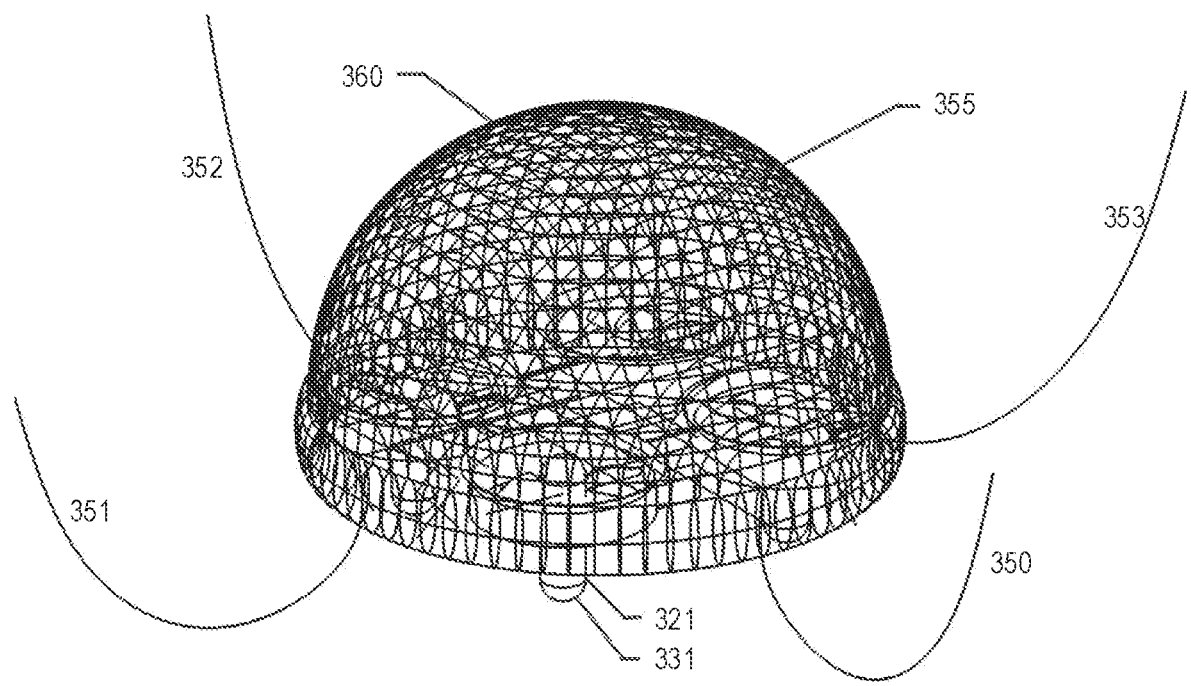
FIG. 12 Shows an example of a flying jellyfish configured aerial vehicle with flexurally dynamic tentacles deflecting up during downward accelerations.

FIG. 12 shows the jellyfish aerial vehicle of FIG. 9 in vertical descending flight. The mesh dome 360 is attached to the wireframe 355 which supports passive flexural tentacles 350, 351, 352, 353. It should be noted that as the aircraft descends, the rotorwash coming from rotors 301, 302, 303, 304, driven by motors 321, 322, 323, 324, is reduced in magnitude. The resulting flow enters a vortex-ring, turbulent wake or windmill brake flow state. These flow states cause the passive flexural tentacles 350, 351, 352, 353 to deflect upwards at their ends in an unsteady fashion at frequencies ranging between 0.01 and 15 Hz via this net wake expansion.

Figure 13:
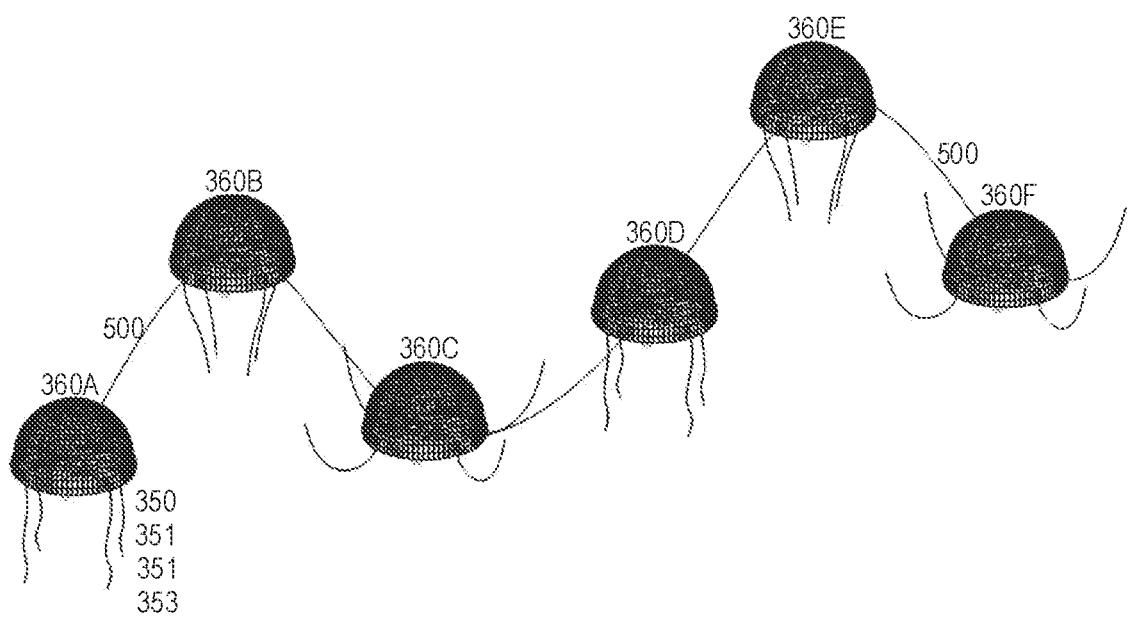
FIG. 13 Shows an example of a flying jellyfish configured aerial vehicle with flexurally dynamic tentacles deflecting up and down during oscillating up/down accelerations.

FIG. 13 shows the jellyfish aerial vehicle of FIG. 9 oscillating up and down in response to different control commands, moving through time. The upper dome of the flying jellyfish at time 1 (e.g., shown at position 360A) is roughly at rest with passive flexural tentacles 350, 351, 352, 353. As the aircraft moves along flight path 500, oscillating up and down in response to different thrust levels commanded from the rotor assemblies, the tentacles move downwards and inwards as the aircraft ascends to positions 360B and 360E. As thrust levels are commanded to decrease, the aircraft moves lower, indicated at positions 360C and 360F. Put another way, the flight path is shown at neutral in position 360A, ascending upward in position 360B, ascending downward in position 360C, neutral in position 360D, ascending upwards in position 360E, and ascending downwards in position 360F.

By controlling the magnitude and frequency of the thrust variations, coming in at frequencies between 0.01 and 15 Hz, the flying jellyfish can be made to look like it is swimming. Given the oscillatory nature of the passive flexural tentacles 350, 351, 352, 353, visibility for the third-person pilot is significantly enhanced.

Figure 14:
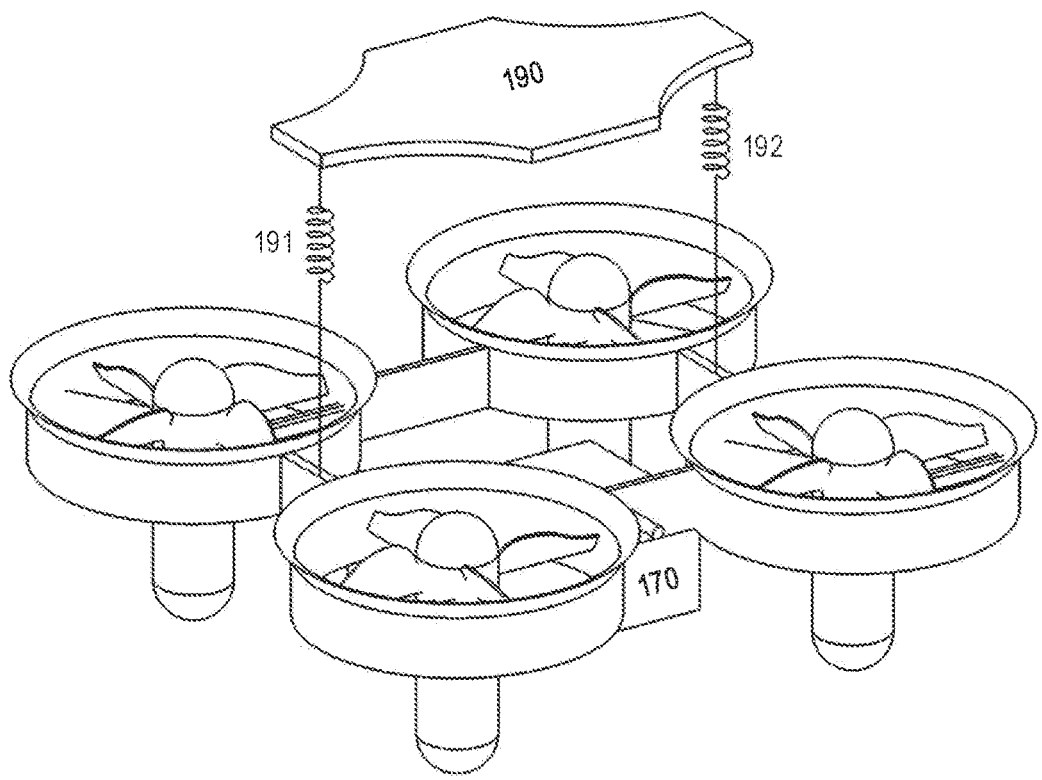
FIG. 14 Shows a compliant mounting arrangement between the control board and the main aerial vehicle structural frame.

FIG. 14 shows one method of mounting the flight control system (FCS) board 190 to the frame. A pair of linear and rotational springs, 191 and 192 can be used to attach the FCS board to the frame. The flight control system may include oscillatory motions in the passive flexural wings. For example, the flight control system my induce the oscillatory motions of the passive flexural wings by causing dynamic variations in rotor speeds of the rotor. In some embodiments, the oscillatory motions may be caused by dynamic variations of rotor speed in a single rotor. In some embodiments, the oscillatory motions may be caused by dynamic variations of rotor speeds in multiple rotors. In some embodiments, the flight control system may cause the oscillatory motions by variations in thrust levels of the rotors. For example, the flight control system may cause the oscillatory motions by variations in thrust level of a single rotor. In some examples, the flight control system may cause the oscillatory motions by variations in thrust level of multiple rotors. As discussed herein, the flight control system may include the oscillatory motions at frequencies between 0.01 Hz and 15 Hz.

These springs allow for both linear oscillations and rotational oscillations along and about the X, Y, and Z axes shown in FIGS. 1, 5 and 9. As the aircraft undergoes typical maneuvers, natural aeromechanical vibrations between the control board and the airframe will occur. These are tailored to result in oscillatory frequencies between 0.01 and 15 Hz during flight.

If one examines typical aeromechanical relationships as described by Roskam and Etkin [11, 12], then several relations result:

$$m(\dot{U}-VR+WQ)=mg \sin \theta + F_{Ax}+T_x$$

$$m(\dot{V}+UR-WP)=mg \sin \phi \cos \theta + F_{Ay}+T_y$$

$$m(\dot{W}-UQ+VP)=mg \cos \phi \cos \theta + F_{Az}+T_z$$

$$I_{xx}\dot{P}-I_{xz}\dot{R}-I_{xz}PQ+(I_{zz}-I_{yy})RQ=L_A+L_T$$

$$I_{yy}\dot{Q}+I_{xz}(P^2-R^2)+(I_{xx}-I_{zz})PR=M_A+M_T$$

$$I_{zz}\dot{R}-I_{xz}\dot{P}+I_{xz}QR+(I_{yy}-I_{xx})PQ=N_A+N_T \quad \text{(eqs. 1)}$$

By varying the amount of thrust being generated by each rotor assembly, three different forces may be generated: $T_x$, $T_y$, $T_z$. Similarly, rolling, pitching and yawing moments may be generated by thrust variations $L_T$, $M_T$ and $N_T$. These force and moment variations similarly result in changes in position, velocities U, V, and W along the X, Y, and Z directions as well as linear accelerations along the axes as well. Moment variations in $L_T$, $M_T$, and $N_T$ with time are used to induce changes in roll, pitch and yaw angles, $\phi$, $\theta$, $\psi$. As oscillations in each of these angles reach the proper frequencies, flexible members like wings, membranes and tentacles can be made to wiggle and flap dynamically.

Figure 15:
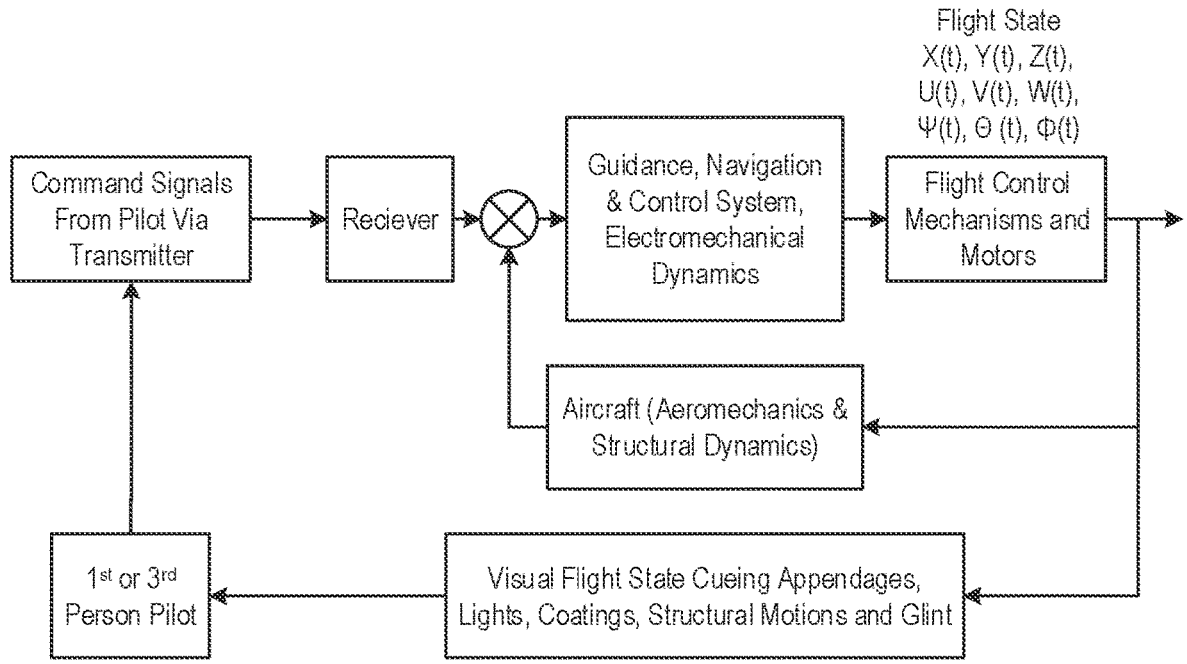
FIG. 15 Shows a notional control scheme for generating mechanical and aeromechanical oscillations described.

Making these motions possible is a control system and feedback loop as shown in FIG. 15. Command signals are sent by the pilot via radio control transmitter to a receiver on the FCS board. Those signals are mixed and sent to the guidance navigation and control (GNC) system. Signals are sent from the GNC system to the motors which turn the various rotors at different speeds generating forces $T_x$, $T_y$, $T_z$ and moments $L_T$, $M_T$ and $N_T$. These forces and moments then lead to changes in flight state, $X(t)$, $Y(t)$, $Z(t)$, $U(t)$, $V(t)$, $W(t)$, $\phi(t)$, $\theta(t)$, $\psi(t)$. These changes in flight state are sensed within the GNC system by inertial sensors. Those sensors feedback flight state changes, including attitude and rates, which are then combined with pilot commands within the inner loop. The outer loop is closed with GPS and/or visual cues via the pilot. Because the aircraft is designed to be more visible at greater distances via the features mentioned above, the pilot can more easily discern its flight state and control the aircraft. These cues may come from glint, moving members, flexing members and/or glitter. The pilot then alters commands to guide the craft to where it is desired. Given that the aircraft is capable of flapping, pitching, rolling, yawing and dynamic movements of different kinds of these modes can be turned on and off by pilot command remotely. Other commands include complete revolutions around the X, Y, and Z axes in the form of rolls, flips and turns.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

INDUSTRIAL APPLICABILITY

Following are sections in accordance with at least one embodiment of the present disclosure:
A1. An aerial vehicle, comprising:
  a fuselage having a body x-axis, the fuselage including:
  an electronics assembly for guidance, navigation, control receipt of remote control commands;
  a battery bay with battery that provides power to the electronics assembly; a plurality of flexible appendages which form wings and/or tentacles that are designed to oscillate when flying under power;
  at least one motor;
  at least one propeller driven by one or more motors which can provide lifting thrust, pitch, yaw and roll control;
an external covering, which may consist of flexible structures, membranes, paint, metal, polymer and/or metalized polymer and/or fibers encapsulated in a matrix.
A2. The aerial vehicle of section A1 with flexible appendages, sheets, membranes or lines shaped like wings, feathers or tentacles that are attached to the aerial vehicle and designed to possess structural natural frequencies between 0.01 and 15 Hz when in static, hovering flight or on the ground;

A3. The aerial vehicle of section A1 with flexible appendages, sheets or lines shaped like wings, feathers or tentacles that are attached to the aerial vehicle and designed to possess structural natural frequencies between 0.01 and 15 Hz when in moving flight at nonzero ground or airspeeds;

A4. The aerial vehicle of section A1 with flexible appendages, sheets or lines shaped like wings, feathers or tentacles that are attached to the aerial vehicle that move, vibrate, bend, twist, flutter, resonate and/or flap in response to aerodynamic forces, aeromechanical vibrations and/or inertial motions of the aircraft between 0.01 and 15 Hz;

A5. The aerial vehicle of claim A1 with flexible appendages and surfaces that are designed to reflect light at given colors or luminosity or otherwise catch the human eye to become more visible at frequencies between 0.01 and 15 Hz;

A6. The aerial vehicle of claim A1 with flexible appendages and surfaces that are designed to emulate the cyclical motions of biological structures like bird or insect feathers or jellyfish tentacles, oscillating frequencies between 0.01 and 15 Hz without the use of direct mechanical manipulation by motors, linkages and/or pushrods;

A7. The aerial vehicle of any of the sections herein, further comprising a device capable of receiving command signals from a human-operated transmitter or satellite.

A8. The aerial vehicle of any of the sections herein, further comprising an energy storage and delivery mechanism.

A9. The aerial vehicle of any of the sections herein, wherein the energy storage and delivery mechanism includes batteries, fuel tanks and/or fuel cells.

A10. The aerial vehicle of section A1 with light emitting elements to indicate flight mode, battery level, initialization state and/or level of binding to a radio controller.

A11. The aerial vehicle of section A1 with one or more light emitting elements which illuminate the flexible appendages from the body of the aircraft.

A12. The aerial vehicle of section A1 with a stability augmentation system built into the electronics assembly.

A13. The aerial vehicle of any of the sections herein, further comprising a stability augmentation system.

A14. The aerial vehicle of any of the sections herein, further comprising a stability augmentation system including attitudes sensors to provide a prescribed level of stability and attitude reference and controllability by a human pilot.

A15. The aerial vehicle of any of the sections herein, further comprising a flight control system including attitudes sensors, mechanical mounts and feedback systems such that oscillatory motions in the flexible appendages are induced by dynamic variations in rotor speeds and thrust levels at frequencies between 0.01-15 Hz.

A16. The aerial vehicle of any of the sections herein, further comprising an outer-loop stability augmentation system and guidance navigation and control system which senses both spatial orientation as well as location and issues flight control system commands to counter deviations from commanded flight paths.

A17. The aerial vehicle of any of the sections herein, further comprising a computing system with instructions that are executable to manipulate the propellers and/or at least one turning vane to guide the aerial vehicle automatically to a safe, stable landing without human pilot intervention or control.

A18. The aerial vehicle of any of the sections herein, further comprising a computing system with instructions that are executable to manipulate the propellers and/or at least one turning vane to execute a complicated flight maneuver like a flip, roll, barrel-roll, loop or any other defined aerobatic maneuver without human pilot intervention or control.

A19. Any aerial vehicle, device, apparatus, method, system, kit, component, or subcomponent as illustrated or described.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An aerial vehicle, comprising:
   a fuselage;
   an electronics assembly connected to the fuselage;
   a plurality of passive flexural wings configured to oscillate during flight;
   at least one motor;
   at least one rotor driven by the at least one motor; and
   a flight control system connected to the motor and the rotor, the flight control system inducing oscillatory motions in the plurality of passive flexural wings by dynamic variations in rotor speeds of the rotor and variations in thrust levels.

2. The aerial vehicle of claim 1, wherein the plurality of passive flexural wings are configured to flex in a spanwise direction, a chordwise direction, and twist.

3. The aerial vehicle of claim 1, wherein the plurality of passive flexural wings are shaped like at least one of wings, feathers, or tentacles.

4. The aerial vehicle of claim 1, wherein the plurality of passive flexural wings include a natural frequency between 0.01 Hz and 15 Hz.

5. The aerial vehicle of claim 4, wherein the plurality of passive flexural wings include the natural frequency of between 0.01 Hz and 15 Hz when in at least one of static flight, hovering flight, moving flight or on a ground.

6. The aerial vehicle of claim 4, wherein the plurality of passive flexural wings include the natural frequency of between 0.01 Hz and 15 Hz when in moving flight at nonzero ground or airspeeds.

7. The aerial vehicle of claim 1, wherein the plurality of passive flexural wings are configured to at least one of move, vibrate, bend, twist, flutter, resonate, or flap in response to at least one of aerodynamic forces, aeromechanical vibrations, or inertial motions of the aerial vehicle at a frequency of between 0.01 Hz and 15 Hz.

8. The aerial vehicle of claim 1, wherein at least one passive flexural wing of the plurality of passive flexural wings includes a surface that reflects light.

9. The aerial vehicle of claim 1, wherein the plurality of passive flexural wings vibrate without direct mechanical linkage to at least one of motors, linkages, or pushrods.

10. The aerial vehicle of claim 1, further comprising one or more lights connected to at least one passive flexural wing of the plurality of passive flexural wings.

11. The aerial vehicle of claim 1, further comprising one or more lights connected to the fuselage and oriented to illuminate at least one passive flexural wing of the plurality of passive flexural wings.

12. A wing for an aerial vehicle, comprising:
    a passive flexural wing, the passive flexural wing having a natural frequency for panel flutter of between 0.01 Hz and 15 Hz; and
    a wing spar attached to the passive flexural wing, wherein a spanwise attachment line of the wing spar to the passive flexural wing is between a leading edge of the passive flexural wing and a half-chord of the passive flexural wing.

13. The wing of claim 12, wherein a chordwise position of the wing spar is attached to the passive flexural wing is from a leading edge to a trailing edge of the passive flexural wing.

14. The wing of claim 12, wherein the wing spar is configured to flex in a spanwise direction and a chordwise direction and allow for camber and twist deflections of the passive flexural wing.

15. An aerial vehicle, comprising:
- a frame;
- a motor connected to the frame;
- a rotor driven by the motor;
- a plurality of passive flexural wings connected to the frame and configured to oscillate when flying under power; and
- a flight control system connected to the motor and the rotor, the flight control system inducing oscillatory motions in the plurality of passive flexural wings by dynamic variations in rotor speeds of the rotor and variations in thrust levels.

16. The aerial vehicle of claim 15, wherein the flight control system induces the oscillatory motions at frequencies of between 0.01 Hz and 15 Hz.

17. The aerial vehicle of claim 15, wherein the flight control system includes a flight control system board connected to the frame with a pair of linear and rotational springs.

18. The aerial vehicle of claim 15, wherein the flight control system is configured to adjust operation of the rotor and at least one turning vane.

19. The aerial vehicle of claim 15, further comprising one or more reflective surfaces on the plurality of passive flexural wings configured to reflect light at frequencies of between 0.01 Hz and 15 Hz.

* * * * *